(12) United States Patent
Fukuda et al.

(10) Patent No.: US 7,901,720 B2
(45) Date of Patent: Mar. 8, 2011

(54) PROCESS FOR PRODUCING TEA EXTRACT CONTAINING NONPOLYMERIC CATECHIN

(75) Inventors: Masahiro Fukuda, Sumida-ku (JP);
Hirokazu Takahashi, Sumida-ku (JP);
Atsushi Konishi, Sumida-ku (JP)

(73) Assignee: Kao Corporation, Tokyo (JP)

( * ) Notice: Subject to any disclaimer, the term of this patent is extended or adjusted under 35 U.S.C. 154(b) by 825 days.

(21) Appl. No.: 11/572,882

(22) PCT Filed: Aug. 3, 2005

(86) PCT No.: PCT/JP2005/014167
§ 371 (c)(1),
(2), (4) Date: Jan. 29, 2007

(87) PCT Pub. No.: WO2006/013871
PCT Pub. Date: Feb. 9, 2006

(65) Prior Publication Data
US 2008/0044545 A1 Feb. 21, 2008

(30) Foreign Application Priority Data

Aug. 6, 2004 (JP) .................................. 2004-230153

(51) Int. Cl.
*A23F 3/16* (2006.01)
(52) U.S. Cl. .......... 426/435; 426/597; 426/590; 426/478; 426/433; 426/384; 426/330.3; 426/541; 426/542; 426/423; 426/424; 426/422
(58) Field of Classification Search .................. 426/597, 426/590, 478, 433, 435, 384, 330.3, 541, 426/423, 542, 424, 422
See application file for complete search history.

(56) References Cited

U.S. PATENT DOCUMENTS

| | | | | |
|---|---|---|---|---|
| 3,477,854 A | * | 11/1969 | Giddey et al. | 426/49 |
| 4,613,672 A | * | 9/1986 | Hara | 549/399 |
| 4,673,530 A | * | 6/1987 | Hara | 252/398 |
| 4,935,256 A | * | 6/1990 | Tsai | 426/330.3 |
| 5,043,100 A | | 8/1991 | Chang et al. | |
| 6,063,428 A | * | 5/2000 | Ekanayake et al. | 426/597 |
| 6,210,679 B1 | * | 4/2001 | Bailey et al. | 424/729 |
| 6,576,275 B1 | * | 6/2003 | Hoving et al. | 424/776 |
| 6,660,320 B1 | * | 12/2003 | Pegg et al. | 426/541 |

FOREIGN PATENT DOCUMENTS

| | | |
|---|---|---|
| EP | 1 690 457 A1 | 8/2006 |
| GB | 892278 | 3/1962 |
| JP | 60-156614 | 8/1985 |
| JP | 61 249346 | 11/1986 |
| JP | 3-284625 | 12/1991 |
| JP | 7-61993 | 3/1995 |
| JP | 9-322710 | 12/1997 |
| JP | 09322710 A * | 12/1997 |
| JP | 2000-159670 | 6/2000 |
| JP | 2002-104982 | 4/2002 |
| JP | 2003-210111 | 7/2003 |
| JP | 2004-49201 | 2/2004 |
| JP | 2005 160348 | 6/2005 |
| JP | 2005 160367 | 6/2005 |
| RU | 2 162 643 C1 | 2/2001 |

* cited by examiner

*Primary Examiner* — Jennifer C McNeil
*Assistant Examiner* — Hong Mehta
(74) *Attorney, Agent, or Firm* — Oblon, Spivak, McClelland, Maier & Neustadt, L.L.P.

(57) ABSTRACT

A process for producing a tea extract containing non-polymer catechins, which includes immersing unfermented tea leaves in ethanol or an ethanol-water solution having an ethanol concentration of from 85 to 99.5 vol % to obtain unfermented tea leaves having a percentage catechin residue of at least 80 wt % based on a catechin content of the unfermented tea leaves before the immersion in the ethanol or ethanol-water solution, and then extracting the unfermented tea leaves with warm water or hot water. The highly-efficient extraction of non-polymer catechins makes it possible to obtain a tea extract, which has an improved taste and does not produce sediment when added to beverages.

7 Claims, No Drawings

PROCESS FOR PRODUCING TEA EXTRACT CONTAINING NONPOLYMERIC CATECHIN

FIELD OF THE INVENTION

This invention relates to a process for the production of a tea extract containing non-polymer catechins, which is not only reduced in bitterness and acridness, but also causes no sediment when added to a beverage.

BACKGROUND OF THE INVENTION

Non-polymer catechins are reported to have a suppressing effect on the increase of cholesterol and the like (see, for example, Patent Document 1). For such a physiological effect to materialize, it is necessary for an adult to drink 4 to 5 cups of tea per day. Therefore, there has been a need for the development of a technology making it possible for a beverage to contain non-polymer catechins at a high concentration so that a large amount of catechins can be ingested with ease.

The methods that enable non-polymer catechins to be contained at a high concentration in a green tea beverage include an extraction method characterized by extracting a great deal of catechins from green tea leaves. On the other hand, with regards to beverages other than green tea beverages, there is a method characterized by adding non-polymer catechins in a dissolved state to a beverage by making use of a concentrated green-tea extract or the like (see, for example, Patent Document 2).

Nonetheless, these conventional methods aimed at extracting a great deal of catechins from tea leaves have a problem in common, in that the extract tends to accompany the bitterness and acridness inherent to green tea leaves, along with the occurrence of sediment in the extract. Meanwhile, even the methods associated with beverages other than green tea beverages are prone to similar problems even if allowed to make use of a concentrated green-tea extract or its purification product, albeit the level of seriousness regarding the problem differs between them.

In order to improve the taste of green tea leaves, some methods have been proposed, such as a method for producing astringency-eliminated tea by spraying a small amount of a 10 to 20 wt % aqueous solution of ethanol to tea leaves in a production process of crude tea or finished tea (for example, Patent Document 3). However, no consideration has been made as to the suppression of bitterness, acridness or sediment in a tea extract, and no disclosure has been made about the control of non-polymer catechins or lipids, either.

For the production of an extract from green tea leaves, on the other hand, a number of methods have been disclosed such as the extraction of tea catechins (for example, Patent Documents 4 to 7), a production method of tea leaf saponin (for example, Patent Document 8), and a production method of a coloring matter-containing dried product. However, these methods are all intended to recover useful component or components from green tea leaves, and are not deemed to be methods for producing useful green tea leaves.

Patent Document 1: JP-A-S60-156614
Patent Document 2: JP-A-S60-13780
Patent Document 3: JP-A-S61-249346
Patent Document 4: JP-A-S60-13780
Patent Document 5: JP-A-S59-219384
Patent Document 6: JP-A-2002-104982
Patent Document 7: JP-A-H09-322710
Patent Document 8: JP-A-H07-61993
Patent Document 9: JP-A-2004-49201

SUMMARY OF THE INVENTION

The present invention provides a process for producing a tea extract with non-polymer catechins contained therein, which comprises immersing unfermented tea leaves in ethanol or an ethanol-water solution having an ethanol concentration of from 85 to 99.5 vol % to obtain unfermented tea leaves having a percentage catechin residue of at least 80 wt % based on a catechin content of the unfermented tea leaves before the immersion in the ethanol or ethanol-water solution, and then extracting the unfermented tea leaves with warm water or hot water.

The present invention also provides a tea extract having a) a Brix degree of from 0.5 to 10, b) a non-polymer catechin concentration of from 120 to 150 mg/mL and c) a lipid amount of from 0.2 to 1.0 wt % in a solid content thereof; which is obtained by the above-described process.

DETAILED DESCRIPTION OF THE INVENTION

Any attempt to extract non-polymer catechins at a high concentration from green tea leaves for the provision of a beverage containing non-polymer catechins at a high concentration has so far been discouraging because of the problem that not only bitterness and astringency derived from non-polymer catechins but also bitterness, acridness and the like due to unidentified components contained in tea leaves in addition to the non-polymer catechins are intensified to raise a taste problem and the resulting beverage manifests pronounced formation of sediment.

The present inventors, therefore, conducted an investigation to extract non-polymer catechins efficiently and to improve taste. As a result, it was found that the extraction of unfermented tea leaves with warm water or hot water, said unfermented tea leaves having been obtained by immersion of unfermented tea leaves in high concentration ethanol and retaining a great deal of non-polymer catechins, makes it possible to reduce bitterness and acridness in a tea extract containing non-polymer catechins and to inhibit the formation of sediment when added to a beverage.

According to the present Invention, it is possible to obtain a tea extract containing non-polymer catechins at a high concentration, is free of bitterness and acridness, and does not produce sediment when added to a beverage. The use of the tea extract obtained by the present invention, therefore, can provide a packaged tea beverage which contains non-polymer catechins at a high concentration and is good in taste and external appearance.

The term "non-polymer catechins" as used herein is a generic term, which collectively encompasses non-epicatechins such as catechin, gallocatechin, catechingallate and gallocatechingallate, and epicatechins such as epicatechin, epigallocatechin, epicatechingallate and epigallocatechingallate.

Unfermented tea leaves useful in the present invention can be green tea leaves, such as *sencha* (middle-grade green tea), *gyokuro* (shaded green tea) or *tencha* (powdered tea), prepared from tea leaves available from the Genus *Camellia*, for example, *C. sinensis*, *C. assamica*, the *Yabukita* variety, or a hybrid thereof. As the green tea leaves, raw green tea leaves or heat-treated tea leaves can be used. From the viewpoint of aroma, however, heat-treated tea leaves are preferred.

The immersion liquid employed in the present invention is ethanol or an ethanol-water solution having an ethanol concentration of from 80 to 99.5 vol %. An unduly low ethanol concentration results in a reduction in the percent recovery of non-polymer catechins, and therefore, is not preferred. A preferred ethanol concentration can range from 90 to 99.5 vol. %.

The ethanol immersion of non-fermented tea leaves in the present invention can be conducted by a conventional method such as stirring. Upon ethanol immersion of non-fermented tea leaves, the ethanol or ethanol-water solution can be used preferably in an amount from 1 to 20 times, more preferably from 1 to 15 times, even more preferably from 1 to 10 times by weight of the tea leaves. From the viewpoint of the efficiency of stirring, it is preferred to use the ethanol or ethanol-water solution 1 or more times by weight of the tea leaves. From the economical viewpoint of using the ethanol or ethanol-water solution in an as small amount as possible, on the other hand, an amount not greater than 20 times is preferred.

The temperature upon ethanol immersion of unfermented tea leaves in the present invention can be preferably from −10 to 40° C., more preferably from 0 to 30° C. from the viewpoint of controlling low the percent dissolution of non-polymer catechins into the ethanol or ethanol-water solution at such a temperature as enabling the removal of lipids, such as wax, that exist in the unfermented tea leaves. If immersion is conducted at from 40° C. to 78° C., non-polymer catechins are allowed to dissolve in a greater amount into the ethanol or ethanol-water solution so that the yield of catechins is lowered. Immersion at −10° C. or lower, on the other hand, requires significant energy, and therefore, is not realistic from the viewpoint of production facilities.

The time of the ethanol immersion of unfermented tea leaves in the present invention can be preferably from 1 to 30 minutes, more preferably from 1 to 20 minutes, even more preferably from 1 to 10 minutes. An immersion time in this range is preferred because the percent recovery of non-polymer catechins becomes high.

As the non-polymer catechins contained in the unfermented tea leaves subjected to ethanol immersion in the present invention, it is desired that preferably 80 wt % or higher, more preferably from 80 to 99 wt %, even more preferably from 90 to 99 wt % remain in terms of percent residue based on their amount contained in the tea leaves before the ethanol immersion. It is to be noted that a percent residue of non-polymer catechins lower than 80 wt % leads to a reduction in the recovered amount of non-polymer catechins available from the extraction of unfermented tea leaves obtained by ethanol immersion. The term "percent residue of catechins" as used herein was determined by the calculation method of a percent recovery of catechins to be indicated in the below-described Examples.

The extraction of non-polymer catechins from the unfermented tea leaves subjected to the ethanol immersion is conducted under conventional conditions for tea extraction, that is, with warm water or hot water. The temperature upon extraction from the tea leaves can be preferably from 70 to 100° C., more preferably 80° C. to 100° C. from the viewpoint of achieving a higher efficiency of extraction for non-polymer catechins.

The amount of water upon extraction from the tea leaves can be from 5 to 40 times by weight, more preferably from 5 to 20 times by weight of the tea leaves. The extraction time from the tea leaves can be preferably from 1 to 30 minutes, more preferably from 1 to 20 minutes, even more preferably from 1 to 10 minutes. An excessively short extraction time leads to insufficient dissolution of non-polymer catechins, while an unduly long extraction time results in a progress of the isomerization reaction of non-polymer catechins through thermal denaturation. Upon extraction, an organic acid or a salt thereof, such as sodium ascorbate, may be added to water beforehand. It is also possible to conduct the extraction while eliminating dissolved oxygen by purging air under boiling or bubbling inert gas such as nitrogen gas, in other words, under a non-oxidizing atmosphere.

The concentration of lipids in the tea extract with non-polymer catechins contained therein as obtained in accordance with the present invention can be preferably from 0.2 to 1.0 wt %, more preferably from 0.2 to 0.8 wt %, even more preferably from 0.2 to 0.5 wt % based on the solid content. A concentration of lipids at a higher than 1.0 wt % in the tea extract with non-polymer catechins contained therein is not preferred, because due to the combined effects between the lipids and other taste components, a beverage with non-polymer catechins added at a high concentration gives a disagreeable bitter taste while failing to provide no refreshing sensation. The percent removal of lipids from unfermented tea leaves as the starting material can be preferably from 40 to 90 wt %, more preferably from 50 to 80 wt % or higher based on the amount of the lipids contained in the tea leaves before the ethanol immersion. A percent removal of lipids lower than 40 wt % from unfermented tea leaves can affect the taste and liquid properties of a tea extract to be available from the extraction of unfermented tea leaves obtained by ethanol immersion or of a tea extract making use of the tea extract.

It is to be noted that the term "tea extract with non-polymer catechins contained therein" as used herein encompasses both of the extract itself and its concentrate. The Brix degree of the tea extract is from 0.5 to 10, with from 1.0 to 8.0 being preferred, and from 2.0 to 6.0 being more preferred. Further, the concentration of catechins in the tea extract is from 120 to 1,500 mg/mL, with from 240 to 1,300 mg/mL being preferred, and from 360 to 1,100 mg/mL being more preferred. A tea extract having a Brix degree of 0.5 or smaller and a catechin concentration of 120 mg/mL or smaller is not preferred from the standpoint of stability when a beverage with catechins contained at a high concentration therein is produced. On the other hand, a tea extract having a Brix degree of 10 or greater and a catechin concentration of 1,500 mg/mL or greater is not preferred from the standpoint of taste.

The thus-obtained tea extract with non-polymer catechins contained therein contains the non-polymer catechins at a high concentration, is reduced in bitterness, acridness and disagreeable taste, and has a good taste. Moreover, no sediment is produced when the tea extract is added to a beverage. The use of the extract, therefore, can produce a packaged beverage, which contains non-polymer catechins at a high concentration and is good in taste and clearness.

The following examples further describe and demonstrate embodiments of the present invention. The examples are given solely for the purpose of illustration and are not to be construed as limitations of the present invention.

EXAMPLES

Measurement of Non-Polymer Catechins

A high-performance liquid chromatograph (model: "SCL-10AVP") manufactured by Shimadzu Corporation was used. The chromatograph was fitted with a liquid chromatograph column packed with octadecyl-introduced silica gel, "L-Column, TM ODS" (4.6 mm on diameter×250 mm in length; product of Chemicals Evaluation and Research Institute, Japan). A sample which had been filtered through a filter (0.8 μm) was subjected to chromatography at a column temperature of 35° C. by the gradient elution method. A solution containing acetic acid at 0.1 mol/L in distilled water was used as a mobile phase (solution A), while a solution containing acetic acid at 0.1 mol/L in acetonitrile was used as another mobile phase (solution B). A measurement was conducted under the conditions of 20 μL sample injection volume and 280 nm UV detector wavelength.

Quantitation of Lipids (the Acid Decomposition Method)

An aliquot (S g) of a vacuum freeze-dried product of an extract was sampled in a beaker. Ethanol (2 mL) and hydrochloric acid (10 mL) were added, followed by heating for 30 to 40 minutes over a water bath to conduct pretreatment. Ethanol (10 mL) and diethyl ether (25 mL) were then poured into a Mojonnier tube, and were shaken and mixed together. Petroleum ether (25 mL) was then poured, followed by shaking and mixing. After the mixture separated into an ether-mixed phase (1) and a water layer, a diethyl ether-petroleum ether mixture (30 mL) was poured into the water layer twice in total, followed by shaking after each pouring. An ether-mixed phase (2) separated as a result was combined with the ether-mixed phase (1), followed by the removal of water for purification. The purified mixture was placed in a flask the weight of which was known ($W_1$ g) and the solvent was distilled off over a sand bath. Subsequently, the flask was kept for 1 hour in a dryer controlled at 105° C. and was then allowed to cool down over silica gel in a desiccator. The flask was weighed ($W_2$ g), and the amount of lipids (g/100 g) was determined in accordance with the following formula:

$$(W_2 - W_1)/S \times 100$$

$$S = 5.0 \pm 0.5 \text{ (g)} \qquad \text{Numerical Formula 1}$$

The percent removal of lipids was defined as (the amount of lipids in an untreated product−the amount of lipids in an invention product)/the amount of lipids in an untreated product×100 (%). The term "untreated product" as used herein means unfermented tea leaves before ethanol immersion.

Measurement of Brix Degree

By a Brix meter ["RX-5000α" (manufactured by ATAGO CO., LTD.)] subjected to a zero point adjustment with deionized water, a sample was measured.

Example 1

In a stainless steel container equipped with a stirrer, 95 (v/v %) ethanol (4,500 g) and CTC green tea from Kenya (1,500 g) were charged and then stirred at room temperature of 20° C. for 10 minutes. Subsequently, the mixture was poured in its entirety into a Buchner funnel with a No. 2 filter paper laid therein, and under reduced pressure, filtration was conducted to recover the tea leaves. The concentration of catechins in the ethanol filtrate was 464.2 mg/100 mL, and therefore, the percent recovery of non-polymer catechins by the ethanol immersion was 93.3 wt %.

It is to be noted that as a calculation method of the percent recovery of non-polymer catechins, in other words, the percent residue of catechins by the ethanol immersion, a calculation was made under the assumption that the concentration of catechins in a tea extract composition with non-polymer catechins contained therein, said composition having been obtained by adding hot water of 85° C. (22,500 g) to a stainless steel container with tea leaves (1,500 g) not subjected to ethanol immersion contained therein, conducting extraction for 10 minutes, filtering the mixture through a 150-mesh screen, cooling the filtrate down to 25° C. and then removing fine powder at 10,000 rpm in a de Laval centrifugal separator, was 100 wt %.

Next, hot water of 85° C. (22,500 g) was charged into a stainless steel container, the tea leaves recovered after the ethanol immersion were charged in their entirety into the stainless steel container, and extraction was conducted for 10 minutes. The mixture was filtered through a 150-mesh screen, the filtrate was cooled down to 25° C. Fine powder was then removed at 10,000 rpm in a de Laval centrifugal separator to obtain, as an example product, a tea extract composition 1 with non-polymer catechins contained therein. The Brix degree and catechin concentration of the extract composition were 3.51 and 773.4 mg/100 mL, respectively. The extract composition was freeze-dried, and then, the lipids were measured. As a result, the amount of the lipids was determined to be 0.54 wt %.

Example 2

An operation was performed as in Example 1 except that the immersion in ethanol was conducted at −10° C. The concentration of catechins in the ethanol filtrate was 113.7 mg/100 mL, and therefore, the percent recovery of non-polymer catechins after the ethanol immersion was 98.4 wt %.

Further, the tea leaves recovered after the ethanol immersion were extracted in exactly the same manner as in Example 1 to obtain, as an example product, a tea extract composition 2 with non-polymer catechins contained therein. The Brix degree and catechin concentration of the extract composition were 3.49 and 784.1 mg/100 mL, respectively. The extract composition was freeze-dried, and then, the lipids were measured. As a result, the amount of the lipids was determined to be 0.45 wt %.

Example 3

An operation was performed as in Example 1 except that the immersion in ethanol was conducted at 40° C. The concentration of catechins in the ethanol filtrate was 1211.7 mg/10 mL, and therefore, the percent recovery of non-polymer catechins after the ethanol immersion was 82.7 wt %. Further the tea leaves recovered after the ethanol immersion were extracted in exactly the same manner as in Example 1 to obtain, as an example product, a tea extract composition 3 with non-polymer catechins contained therein. The Brix degree and catechin concentration of the extract composition were 3.26 and 659.9 mg/100 mL, respectively. The extract composition was freeze-dried, and then, the lipids were measured. As a result, the amount of the lipids was determined to be 0.60 wt %.

Example 4

An operation was performed as in Example 1 except that the immersion in ethanol was conducted with the amount of the ethanol being set at 30,000 g (20 times by weight the tea leaves). The concentration of catechins in the ethanol filtrate was 109.5 mg/100 mL, and therefore, the percent recovery of non-polymer catechins after the ethanol immersion was 91.6 wt %.

Further, the tea leaves recovered after the ethanol immersion were extracted in exactly the same manner as in Example 1 to obtain, as an example product, a tea extract composition 4 with non-polymer catechins contained therein. The Brix degree and catechin concentration of the extract composition were 3.12 and 732.6 mg/100 mL, respectively. The extract composition was freeze-dried, and then, the lipids were measured. As a result, the amount of the lipids was determined to be 0.31 wt %.

Example 5

An operation was performed as in Example 1 except that the immersion in ethanol was conducted with the ethanol concentration being set at 99.5 v/v %. The concentration of catechins in the ethanol filtrate was 70.5 mg/100 mL, and therefore, the percent recovery of non-polymer catechins after the ethanol immersion was 96.0 wt %.

Further, the tea leaves recovered after the ethanol immersion were extracted in exactly the same manner as in Example 1 to obtain, as an example product, a tea extract composition 5 with non-polymer catechins contained therein. The Brix degree and catechin concentration of the extract composition were 3.58 and 832.4 mg/100 mL, respectively. The extract composition was freeze-dried, and then, the lipids were measured. As a result, the amount of the lipids was determined to be 0.38 wt %.

Example 6

An operation was performed as in Example 1 except that the immersion in ethanol was conducted with the ethanol concentration being set at 85.0 v/v %. The concentration of catechins in the ethanol filtrate was 870.5 mg/100 mL, and therefore, the percent recovery of non-polymer catechins after the ethanol immersion was 85.7 wt %.

Further, the tea leaves recovered after the ethanol immersion were extracted in exactly the same manner as in Example 1 to obtain, as an example product, a tea extract composition 6 with non-polymer catechins contained therein. The Brix degree and catechin concentration of the extract composition were 3.23 and 713.5 mg/100 mL, respectively. The extract composition was freeze-dried, and then, the lipids were measured. As a result, the amount of the lipids was determined to be 0.45 wt %.

Comparative Example 1

In exactly the same manner as in Example 1 except that the immersion in ethanol was not conducted, extraction was performed to obtain a comparative tea extract composition 1 with non-polymer catechins contained therein. The Brix degree and catechin concentration of the extract composition were 3.68 and 868.7 mg/100 mL, respectively. The extract composition was freeze-dried, and then, the lipids were measured. As a result, the amount of the lipids was determined to be 1.14 wt %.

Comparative Example 2

An operation was performed as in Example 1 except that the immersion in ethanol was conducted at 65° C. The concentration of catechins in the ethanol filtrate was 3,357.9 mg/100 mL, and therefore, the percent recovery of non-polymer catechins after the ethanol immersion was 50.8 wt %.

Further, the tea leaves recovered after the ethanol immersion were extracted in exactly the same manner as in Example 1 to obtain a comparative tea extract composition 2 with non-polymer catechins contained therein. The Brix degree and catechin concentration of the extract composition were 2.98 and 635.5 mg/100 mL, respectively. The extract composition was freeze-dried, and then, the lipids were measured. As a result, the amount of the lipids was determined to be 0.72 wt %.

Comparative Example 3

An operation was performed as in Example 1 except that the immersion in ethanol was conducted with the ethanol concentration being set at 50 v/v %. The concentration of catechins in the ethanol filtrate was 3,991.2 mg/100 mL, and therefore, the percent recovery of non-polymer catechins after the ethanol immersion was 42.7 wt %.

Further, the tea leaves recovered after the ethanol immersion were extracted in exactly the same manner as in Example 1 to obtain a comparative tea extract composition 3 with non-polymer catechins contained therein. The Brix degree and catechin concentration of the extract composition were 2.74 and 605.7 mg/100 mL, respectively. The extract composition was freeze-dried, and then, the lipids were measured. As a result, the amount of the lipids was determined to be 0.69 wt %.

Examples 1-6 and Comparative Examples 1-3

Water dilutions prepared by adjusting the catechin concentrations of the tea extract compositions 1-6 with non-polymer catechins contained therein, which had been obtained in accordance with the present invention, to 180 mg/100 mL were assessed for taste by a panel of ten (10) expert assessors in accordance with the below-described ranking standards. The results are shown in Table 1.

3: Neither bitter nor acrid.
2: Average bitterness and acridness.
1: Strong bitterness and acridness.

Five-fold dilutions of the extracts in water were left over at 55° for 48 hours, and were then visually observed to assess the occurrence of sediment. The results are shown in Table 1.

3: Practically not observed
2: Slightly observed.
1: Substantial sediment was observed (when unfermented tea leaves not subjected to ethanol treatment were used).

TABLE 1

| | | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Immersion in ethanol | Amount of tea leaves (g) | 1,500 | 1,500 | 1,500 | 1,500 | 1,500 | 1,500 | 1,500 | 1,500 | 1,500 |
| | Amount of ethanol (g) | 4,500 | 4,500 | 4,500 | 30,000 | 4,500 | 4,500 | — | 4,500 | 4,500 |
| | Immersion temperature (° C.) | 20 | −10 | 40 | 20 | 20 | 20 | — | 65 | 20 |
| | Ethanol concentration (v/v %) | 95 | 95 | 95 | 95 | 99.5 | 85 | — | 95 | 50 |
| | Concentration of catechins in immersion ethanol (mg/100 mL) | 464.2 | 113.7 | 1211.7 | 109.5 | 70.5 | 870.5 | — | 3357.9 | 3991.2 |
| | Percent residue of catechins (wt %) | 93.3 | 98.4 | 82.7 | 91.6 | 96.0 | 85.7 | 100 | 50.8 | 42.7 |
| Extraction with hot water | Brix degree of extract | 3.51 | 3.49 | 3.26 | 3.12 | 3.58 | 3.23 | 3.68 | 2.98 | 2.74 |
| | Concentration of catechins in extract (mg/100 mL) | 773.4 | 784.1 | 659.9 | 732.6 | 832.4 | 713.5 | 867.7 | 635.5 | 605.7 |

TABLE 1-continued

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Lipids in solid content (wt %) | 0.54 | 0.45 | 0.60 | 0.31 | 0.38 | 0.45 | 1.14 | 0.72 | 0.69 |
| Percent removal of lipids (wt %) | 52.6 | 60.5 | 47.4 | 72.8 | 74.1 | 60.5 | — | 36.8 | 39.5 |
| Assessment of taste | 3 | 3 | 3 | 3 | 3 | 3 | 1 | 1 | 2 |
| Assessment of sediment | 3 | 3 | 3 | 3 | 3 | 3 | 1 | 2 | 2 |

As is evident from Table 1, Examples 1-6 which fulfilled the requirements for the present invention were reduced in bitterness, acridness and coarse taste derived from lipids and other components and were good in taste owing to the dissolution of the lipids in ethanol. Further, they did not produce sediment even when diluted with water. In contrast, Comparative Example 1 in which no immersion in ethanol was performed had bitterness, acridness, a coarse taste and the like. It produced sediment when diluted with water.

The invention claimed is:

1. A process for producing a tea extract containing non-polymer catechins, comprising the steps of immersing unfermented tea leaves in ethanol or an ethanol-water solution having an ethanol concentration of from 85 to 99.5 vol % to obtain unfermented tea leaves having a percentage catechin residue of at least 80 wt % based on a catechin content of said unfermented tea leaves before said immersion in said ethanol or ethanol-water solution, filtration under reduced pressure to recover the unfermented tea leaves, and extracting said recovered unfermented tea leaves with warm water or hot water, wherein an amount of lipids in a solid content of said tea extract is from 0.2 to 1.0 wt %.

2. The process according to claim 1, wherein the amount of said ethanol or ethanol-water solution in said immersing ranges from 1 to 20 times by weight based on the weight of said unfermented tea leaves.

3. The process according to claim 1, wherein said immersion in said ethanol or ethanol-water solution is conducted at from −10 to 30° C.

4. The process according to claim 1, wherein said unfermented tea leaves are green tea leaves.

5. The process according to claim 1, wherein an immersion time is 1 to 10 minutes.

6. The process according to claim 4, wherein said green tea leaves are heat-treated green tea leaves.

7. A tea extract having a) a Brix degree of from 0.5 to 10, b) a non-polymer catechin concentration of from 120 to 1,500 mg/100 mL and c) a lipid amount of from 0.2 to 1.0 wt % in a solid content thereof; and obtained by immersing unfermented tea leaves in ethanol or an ethanol-water solution having an ethanol concentration of from 85 to 99.5 vol % to obtain unfermented tea leaves having a percentage catechin residue of at least 80 wt % based on a catechin content of said unfermented tea leaves before said immersion in said ethanol or ethanol-water solution, filtration under reduced pressure to recover the unfermented tea leaves, and then extracting said recovered unfermented, tea leaves with warm water or hot water.

* * * * *